United States Patent
Prabhakar

(10) Patent No.: US 7,140,768 B2
(45) Date of Patent: Nov. 28, 2006

(54) SYSTEM AND METHOD OF MONITORING TEMPERATURE

(75) Inventor: Jay Prabhakar, Bedford, NH (US)

(73) Assignee: Cold Chain Technologies, Inc., Holliston, MA (US)

( * ) Notice: Subject to any disclaimer, the term of this patent is extended or adjusted under 35 U.S.C. 154(b) by 0 days.

(21) Appl. No.: 10/413,412

(22) Filed: Apr. 14, 2003

(65) Prior Publication Data
US 2004/0008752 A1 Jan. 15, 2004

Related U.S. Application Data

(60) Provisional application No. 60/395,934, filed on Jul. 15, 2002.

(51) Int. Cl.
*G01D 15/00* (2006.01)
*G01K 3/00* (2006.01)

(52) U.S. Cl. .................. 374/186; 374/102; 374/124

(58) Field of Classification Search ............... 374/186, 374/208, 141–142, 163, 170
See application file for complete search history.

(56) References Cited

U.S. PATENT DOCUMENTS

| | | | | |
|---|---|---|---|---|
| 4,636,093 | A * | 1/1987 | Nagasaka et al. ........... 374/186 |
| 4,642,785 | A * | 2/1987 | Packard et al. ............. 374/169 |
| 4,729,671 | A | 3/1988 | Asano et al. |
| 4,816,822 | A | 3/1989 | Vache et al. |
| 4,877,333 | A * | 10/1989 | Ota et al. .................... 374/169 |
| 4,878,184 | A * | 10/1989 | Okada et al. ............... 374/107 |
| 4,972,099 | A | 11/1990 | Amano et al. |
| 5,066,141 | A * | 11/1991 | Ikeda et al. ................ 374/169 |
| 5,135,045 | A * | 8/1992 | Moon ......................... 374/170 |
| 5,211,476 | A | 5/1993 | Coudroy |
| 5,228,778 | A * | 7/1993 | Nakatani ..................... 374/33 |
| 5,295,746 | A * | 3/1994 | Friauf et al. ................ 374/170 |
| 5,313,848 | A | 5/1994 | Santin et al. |
| 5,332,315 | A | 7/1994 | Baker et al. |
| 5,412,590 | A * | 5/1995 | Gaudette et al. ............ 374/186 |
| 5,425,375 | A * | 6/1995 | Chin et al. .................. 374/142 |
| 5,493,248 | A * | 2/1996 | Dunn et al. ................. 327/108 |
| 5,653,239 | A * | 8/1997 | Pompei et al. .............. 374/121 |
| 5,790,965 | A * | 8/1998 | Abe ............................. 701/29 |
| 5,835,025 | A | 11/1998 | Zufelt et al. |
| 5,857,777 | A * | 1/1999 | Schuh ........................ 374/172 |
| RE36,200 | E | 4/1999 | Berrian et al. |

(Continued)

OTHER PUBLICATIONS

International Search Report for PCT Application No. PCT/US03/22085 (the corresponding PCT application to the present application) mailed Dec. 23, 2003.

(Continued)

*Primary Examiner*—Yaritza Guadalupe-McCall
(74) *Attorney, Agent, or Firm*—Kriegsman & Kriegsman

(57) ABSTRACT

A temperature monitoring system includes a device for monitoring temperature over a period of time, an adaptor in communication with the temperature monitoring device (TMD) and a data programming device (DPD) in communication with the adaptor. The TMD includes a temperature sensor, a central processing unit (CPU) electrically connected to the temperature sensor, and a power source for continuously supplying power to the CPU. The CPU includes volatile memory into which measurements made by the temperature sensor are stored, the volatile memory in the CPU serving as the sole memory device in the TMD. The TMD is free of means for suspending power from the power source to the CPU. In use, each successive measurement taken by the temperature sensor overwrites the previous measurement stored into the CPU volatile memory. In this manner, the TMD stores no historical data throughout its monitoring process.

13 Claims, 15 Drawing Sheets

U.S. PATENT DOCUMENTS

| | | | | |
|---|---|---|---|---|
| 5,911,507 | A | * | 6/1999 | Jaynes ..................... 374/102 |
| 6,090,050 | A | | 7/2000 | Constantinides |
| 6,275,779 | B1 | | 8/2001 | Pohle et al. |
| 6,283,628 | B1 | | 9/2001 | Goodwin |
| 6,295,510 | B1 | | 9/2001 | Discenzo |
| 6,300,871 | B1 | * | 10/2001 | Irwin et al. ............ 340/539.28 |
| 6,438,057 | B1 | * | 8/2002 | Ruckerbauer ............... 365/222 |
| 6,438,502 | B1 | | 8/2002 | Awtrey |
| 6,501,390 | B1 | * | 12/2002 | Chainer et al. ........ 340/870.16 |
| 6,609,824 | B1 | * | 8/2003 | Sato et al. .................. 374/132 |
| 6,629,000 | B1 | * | 9/2003 | Moon et al. ................... 700/94 |
| 6,629,776 | B1 | * | 10/2003 | Bell et al. .................... 374/170 |
| 6,695,471 | B1 | * | 2/2004 | Hashimoto et al. ......... 374/134 |
| 2001/0027328 | A1 | | 10/2001 | Lum et al. |

OTHER PUBLICATIONS

Online definition of the term "read-only memory" at www.onlinedictionary.datasegment.com; 1 page.

Online definition of the term "Flash ROM" at www.isprank.com; 1 page.

Online definition of the term "Flash ROM" at www.cheap56k.com; 1 page.

Online definition of the term "flash memory" at www.semiconductorglossary.com; 1 page.

Online definition of the term "flash memory" at www.onlinedictionary.datasegment.com; 1 page.

Online definition of the term "Flash memory" at www.pdamd.com; 1 page.

Online definition of the term "Flash memory" at www.encyclopedia.laborlawtalk.com; 1 page.

Online definition of the term "non-volatile memory" at www.webopedia.com; 1 page.

Online definition of the term "non-volatile memory" at www.semiconductorglossary.com; 1 page.

Online definition of the term "Non-volatile memory" at www.bitpipe.com; 1 page.

Online definition of the term "non-volatile storage" at www.onlinedictionary.datasegment.com; 1 page.

Online definition of the term "Volatile Memory" at www.bitpipe.com; 1 page.

* cited by examiner

| Operating Condition for Device (13) | LCD Action in Response to Operating Condition | LED Action in Response to Operating Condition |
|---|---|---|
| Powered Off | Blank display | Both LEDs OFF |
| Powered on/ Prior to being programmed | Decimal point icon stays continuously turned ON | Green LED alternates flashing ON for 0.125 secs and OFF for 0.5 secs |
| Programmed/ Prior to Activation | Decimal point icon blinks at 1Hz rate | Green LED alternates flashing ON for 0.125 secs and OFF for 4 secs |
| Programmed/ Activated but in delay period | OK and DELAY icons blink at 1 Hz rate and countdown value displayed | Red and Green LEDs alternate flashing ON for 0.125 secs and OFF for 2 secs |
| Programmed/Activated in Monitoring Mode | OK icon blinks at 1 Hz rate | Green LED flashes ON for 0.125 secs and OFF for 2 secs |
| Temperature excursion detected above OK zone | OK, circle-slash, and up arrow icons blink at 1 Hz | Red and Green LEDs flash together ON for 0.125 secs and OFF for 2 secs |
| Temperature excursion detected below OK zone | OK, circle-slash, and down arrow icons blink at 1Hz | Red LED flashes ON for 0.125 secs and OFF for 2 secs |
| Recall of the programmed temperature monitoring parameters | Cyclic display of: OK icon; Last registered temperature; Upper inner temp; Upper outer temp; Lower inner temp; Lower outer temp; Delay period; Allowable excursion time for HIGH TEMP1; Allowable excursion time for LOW TEMP1; time interval setting | No response |
| Detailed Monitoring Information with device in: (a) OK condition (b) Temperature breach condition | (a) OK icon blinks @ 1Hz; Simultaneous cyclic display of last registered temperature, and Elapsed Time (b) OK/circle-slash/arrow icons blink @ 1Hz; Simultaneous cyclic display of excursion temperature recorded and elapsed time | No display |
| Device Malfunction relating to: (a) defective programming (b) defective temp reading | (a) display generates "err2" message (b) display generates "err3" message | (a) Red LED flashes twice followed by two seconds OFF (b) Red LED flashes three times followed by two seconds OFF |

FIG. 15

SYSTEM AND METHOD OF MONITORING TEMPERATURE

CROSS-REFERENCE TO RELATED APPLICATIONS

The present application claims the benefit under 35 U.S.C. 119(e) of U.S. Provisional Patent Application Ser. No. 60/395,934 filed Jul. 15, 2002, the disclosure of which is incorporated herein by reference.

BACKGROUND OF THE INVENTION

The present invention relates generally to the field of environmental monitoring systems. More particularly, the present invention relates to temperature monitoring systems which operate in view of client-specified parameters.

There exist many types of products which are acutely sensitive to the temperature of its immediate environment. Examples of temperature-sensitive products include food and beverages, medical and pharmaceutical products, biological materials, and industrial chemicals and adhesives. When a temperature-sensitive product is exposed to temperatures which exceed predefined parameters, or thresholds, the product is said to have experienced a temperature excursion, or breach. As can be appreciated, having a temperature-sensitive product experience a temperature excursion can compromise the safety, efficacy, potency and/or shelf life of the shipped product, which is highly undesirable.

As a result, the packaging industry has created, in certain circumstances, temperature controlled packaging that is intended to maintain an acceptable temperature range for the product that is being shipped. Although well-known and widely used in the art, temperature controlled packages can experience temperatures outside their intended range. For this reason, it is highly important for the party receiving the temperature-sensitive product to be able to determine whether the product was maintained in its acceptable temperature range throughout the shipping process.

Accordingly, temperature monitoring devices are well-known in the art and are commonly used to track the internal temperatures experienced by the packaged product. Specifically, a temperature monitoring device is typically placed inside the temperature controlled package by the shipping party. After the package has been shipped, the receiving party opens the temperature controlled package and analyzes the temperature monitoring device to determine whether the temperature within the package was maintained within the predefined temperature parameters.

A first type of temperature monitoring device, or indicator, which is well-known and widely used in the art is in the form of a one-time trip switch which triggers a particular, irreversible indicator, such as a color change, when the temperature it experiences breaches a predefined threshold. For example, in U.S. Pat. No. 4,729,671 there is disclosed a disposable monitoring device which is constructed to experience a chemical reaction when exposed to a particular temperature parameter. In response to such a chemical reaction, the indicator visually indicates the temperature excursion by producing a color change using a dye.

This first type of temperature monitoring device is typically used in the following manner. When the shipper is prepared to ship a desired package, the shipper activates the indicator (e.g., by pulling an activating tab) and deposits the indicator onto the shipped item. Once shipped, the recipient of the package can determine whether a particular temperature excursion was experienced by observing the coloration of the indicator.

As can be appreciated, the first type of temperature indicator as described above suffers from a few notable drawbacks.

As a first drawback, the first type of temperature indicator provides the receiving party with very limited information relating to a temperature excursion. In particular, the indicator is only capable of notifying a recipient whether the predefined temperature parameter of the indicator was maintained or breached. The indicator is not capable of informing the receiving party with any of the details of a temperature excursion (e.g., the actual temperatures reached beyond the threshold temperature, the precise time during the shipping period when the temperature excursion occurred, etc.).

As a second drawback, the first type of temperature indicator has been found to be relatively inaccurate (some chemically based temperature indicators have been found to have a degree of uncertainty beyond +/−3° C. for example). The inaccuracies associated with the first type of temperature indicators are often the result of certain external factors (e.g., the shelf life of the marker, proper storage requirements, preconditioned temperatures, etc.) which can significantly alter chemical properties of the indicator.

As a third drawback, the first type of temperature indicator is typically capable of monitoring only one particular temperature threshold and is limited to defining only one direction of breach. (e.g., whether the temperature breaches a particular temperature value by going from cold to hot for a particular period of time). However, in many applications, it is desirable to monitor whether the temperatures within a package are maintained within a temperature range which includes an upper limit as well as a lower limit. In this circumstance, a pair of indicators would be required, one indicator being used to monitor the upper limit of the temperature range and functioning as indicating breach when going from a lower temperature to a higher temperature and the other indicator being used to monitor the lower limit of the temperature range and functioning as indicating breach when going from a higher temperature to a lower temperature.

A second type of temperature monitoring device which is well-known and widely used in the art is commonly referred to as a data logger. A data logger is a complex electronic device which can be programmed with client-specified parameters to monitor the temperature within a container. In use, a data logger is capable of sampling the temperature within a package at user-defined time intervals and, in turn, storing the results of said data samples into a non-volatile memory device located in the data logger. In this manner, the data logger is capable of storing a wide variety of historical data accumulated during its client-specified, monitoring period.

A first type of data logger which is well-known in the art is commonly used in the following manner to track the temperatures within a package during its shipment. The data logger is programmed by the users to log and monitor the internal temperature of a package in view of certain specified parameters (e.g., the upper and lower temperature thresholds for the target temperature range, the frequency of data sampling, etc.). The data logger is then activated by the shipping party (e.g., by depressing an externally accessible button) and packaged within the container. During the shipping process, the data logger measures the internal temperatures within the container. The data accumulated during each sampling period is then stored into a nonvolatile memory device located within the logger. Once the package reaches its final destination, the receiving party removes the data logger from the package and either downloads its information to a personal computer (PC) via an electrical connection or ships back the device to the shipping party for subsequent downloading of information.

As can be appreciated, the first type of data logger described above suffers from one notable drawback. Specifically, the first type of data logger described above does not immediately provide the receiving party with information relating to the temperature monitoring data that was accumulated during the tracking period. Rather, it is typically required that the data logger be electronically linked to a PC whereupon the data is further analyzed as to what occurred during shipment. Whether downloaded at the receiver's site or shipped back to the sending party, the process is highly time-consuming and inconvenient. In response to the aforementioned drawback, a second type of data logger which is well-known in the art is provided with a light emitting diode (LED) display to inform the receiving party, by means of a flashing set of LED lights, to alert the receiving party whether or not the received package experienced a breach of predefined temperature ranges within the package. Although somewhat more helpful, this type of data logger suffers from the same drawback as the previous data logger in that its full analysis can only be performed by linking it to a PC, a cumbersome and time consuming task for the receiving party.

In response to the aforementioned drawback, a third type of data logger which is well-known in the art is provided with a display to inform the receiving party with pertinent information relating to the historical data stored thereon. As a result, this type of data logger enables the receiving party to readily determine whether a temperature excursion occurred during the period of shipment by simply viewing the display.

As can be appreciated, the third type of data logger described above suffers from a few notable drawbacks.

As a first drawback, the third type of data logger described above stores all of its accumulated historical data into its internal memory. Because all of the historical data is stored into the data logger memory, it is often difficult to view by means of its LCD the most relevant information stored in the data logger (e.g., data relating to a temperature excursion).

As a second drawback, the third type of data logger described above includes large data storage capabilities. As a result, this type of data logger is often relatively large in size, heavy in weight, and expensive to manufacture.

As a third drawback, the third type of data logger described above is highly susceptible to tampering and manipulation. Specifically, this type of data logger is often provided with a power on/off button which enables an unscrupulous person to temporarily deactivate the data logger.

SUMMARY OF THE INVENTION

It is an object of the present invention to provide a novel system and method of monitoring temperature.

It is another object of the present invention to provide a novel system and method of monitoring temperature based upon client-specified parameters.

It is another objective of the present invention to provide a novel system and method of quickly and easily programming client specified parameters into a temperature monitoring device.

It is yet another object of the present invention to provide a system and method as described above which can be used to provide detailed information relating to a detected temperature excursion.

It is still another object of present invention to provide a system and method as described above which is less susceptible to tampering.

It is yet still another object of the present invention to provide a system and method as described above which is accurate, has a limited number of parts, is easy to use, is inexpensive to manufacture, is small in size, and is light in weight.

It is still another object of the present invention to simplify the logistics associated with data loggers by not recording historical time temperature data which, in turn, is often required to be stored, archived and managed.

Therefore, according to one feature of the present invention, there is provided a device for monitoring temperature over a period of time, said device comprising a temperature sensor for generating a first signal in response to a first temperature detected, and a central processing unit (CPU) in electrical connection with said temperature sensor, said CPU comprising volatile memory into which said first signal is stored, wherein said device is free of memory external to said CPU.

According to another feature of the present invention, there is provided a temperature monitoring system comprising a temperature monitoring device, an adaptor removably connected to said temperature monitoring device, said adaptor being in data communication with said temperature monitoring device through a first data communication channel, and a data programming device in data communication with said adaptor through a second data communication channel, wherein a parameter can be programmed into said temperature monitoring device by said data programming device via said adaptor.

According to another feature of the present invention, there is provided a method of monitoring temperature using a temperature monitoring device, said temperature monitoring device including a temperature sensor and a central processing unit (CPU), the CPU including volatile memory, said method comprising the steps of taking a first temperature measurement using said temperature sensor, storing the results of said first temperature measurement into the volatile memory of said CPU, taking a second temperature measurement using said temperature sensor, and storing the results of said second temperature measurement into the volatile memory of said CPU, the results of said second temperature measurement overwriting the results of said first temperature measurement stored in the volatile memory of said CPU.

According to another feature of the present invention, there is provided a method of monitoring temperature using a temperature monitoring device, said temperature monitoring device including a temperature sensor and a central processing unit (CPU), the CPU including volatile memory, said method comprising the steps of taking a first temperature measurement using said temperature sensor during a first time interval, storing the results of said first temperature measurement into the volatile memory of said CPU during the first time interval, analyzing the results of said first temperature measurement using said CPU during a second time interval, taking a second temperature measurement using said temperature sensor during the second time interval, and storing the results of said second temperature measurement into the volatile memory of said CPU during the second time interval.

Various other features and advantages will appear from the description to follow. In the description, reference is made to the accompanying drawings which form a part thereof, and in which is shown by way of illustration, various embodiments for practicing the invention. The embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts:

FIG. 15 is a chart depicting the particular response provided by the display of the temperature monitoring device shown in FIG. 1 during selected operating conditions, the chart representing the display in terms of the liquid crystal display shown in FIG. 5 as well as a pair of light emitting diodes (LEDs), one LED being red in color and one LED being green in color.

DETAILED DESCRIPTION OF THE PREFERRED EMBODIMENT

Figure 1:
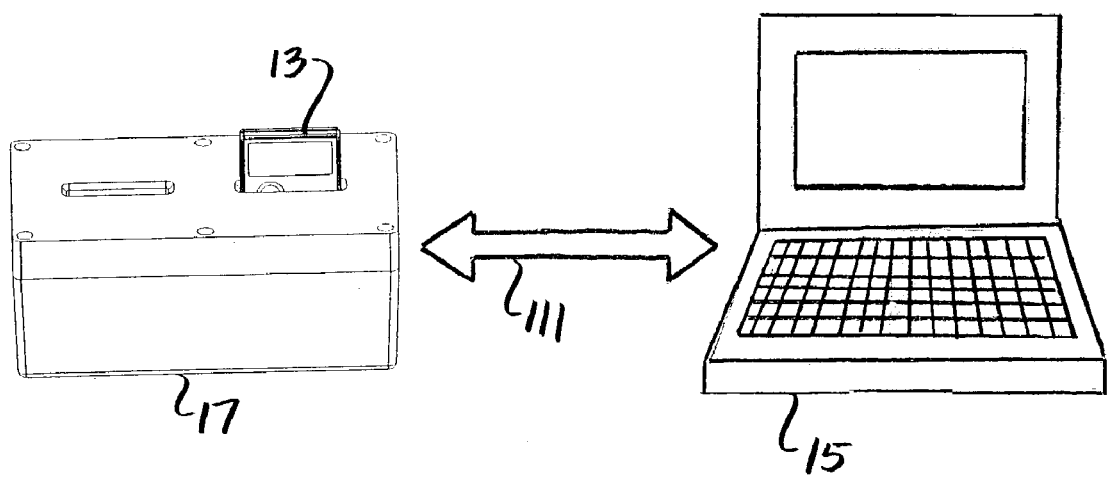
FIG. 1 is a front perspective view of a temperature monitoring system constructed according to the teachings of the present invention, the system being shown with the temperature monitoring device in electrical connection with the adaptor, the system being shown with the adaptor in communication with the data programming device.

Referring now to FIG. 1, there is shown a system for monitoring an externally applied parameter which is constructed according to the teachings of the present invention, said system being identified generally by reference numeral 11. Although system 11 is described below in the context of monitoring the temperature of a client controlled environment (e.g., the interior of a temperature controlled package), it should be noted that system 11 can be modified to monitor other types of externally applied parameters, such as humidity, mechanical shock and vibration, pH levels, pressure, voltage, and current, without departing from the spirit of the present invention.

System 11 comprises a temperature monitoring device 13, a data programming device 15, and an adaptor 17. As will be described further in detail below, temperature monitoring device 13 is a disposable temperature monitoring unit which can be programmed for operation by data programming device 15 via adaptor 17.

As will be further described below, system 11 utilizes five separate lines for transmitting and receiving data from data programming device 15 to temperature monitoring device 13 via adaptor 17. Specifically, system 11 utilizes a data line DATA for the transmission of bit-serial data, a clock line Ck for serving as a time-synchronizing standard for setting the speed of the data transfer along data line DATA, a data direction control line TxH for controlling the direction in which data flows along data line DATA, a ready line RDY\ for determining whether a particular component of system 11 is ready to send or receive data, and a return line RET which is connected to ground.

Figure 2:
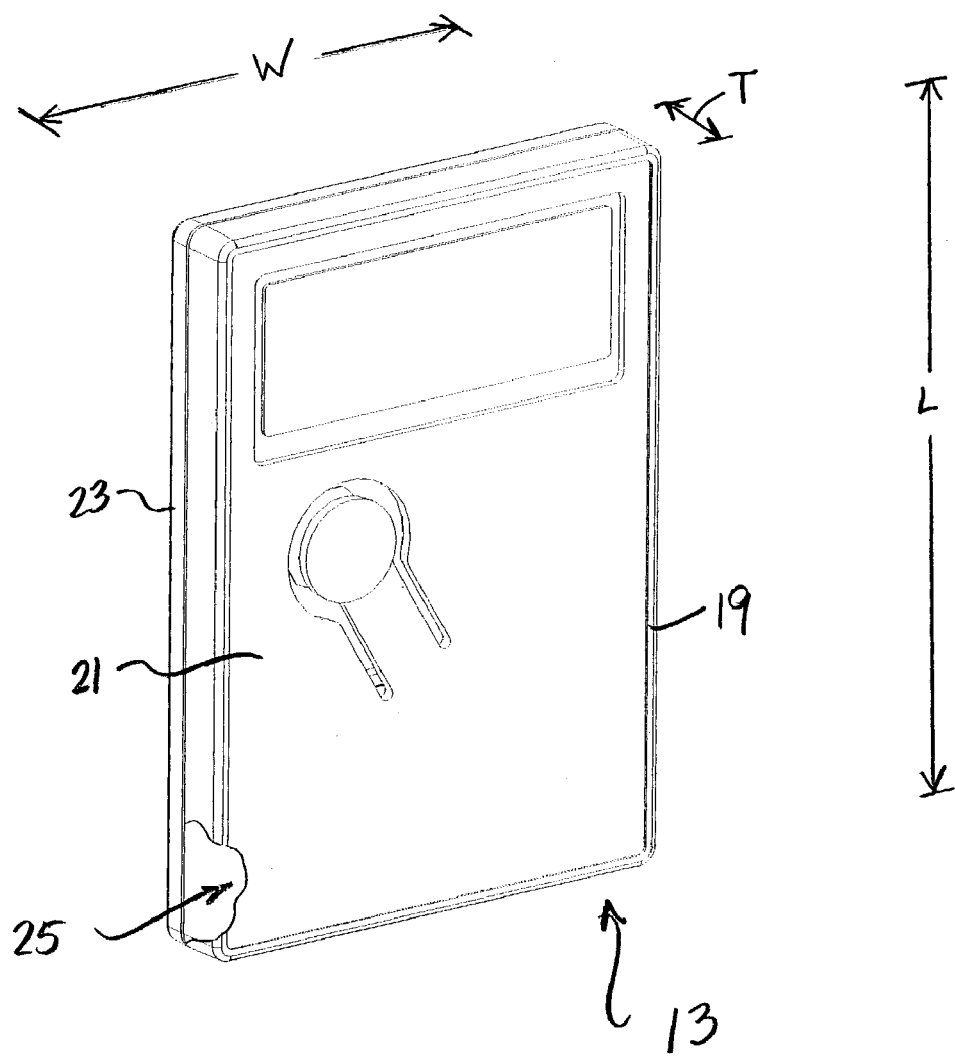
FIG. 2 is an enlarged front perspective view, broken away in part, of the temperature monitoring device shown in FIG. 1.
Figure 3:
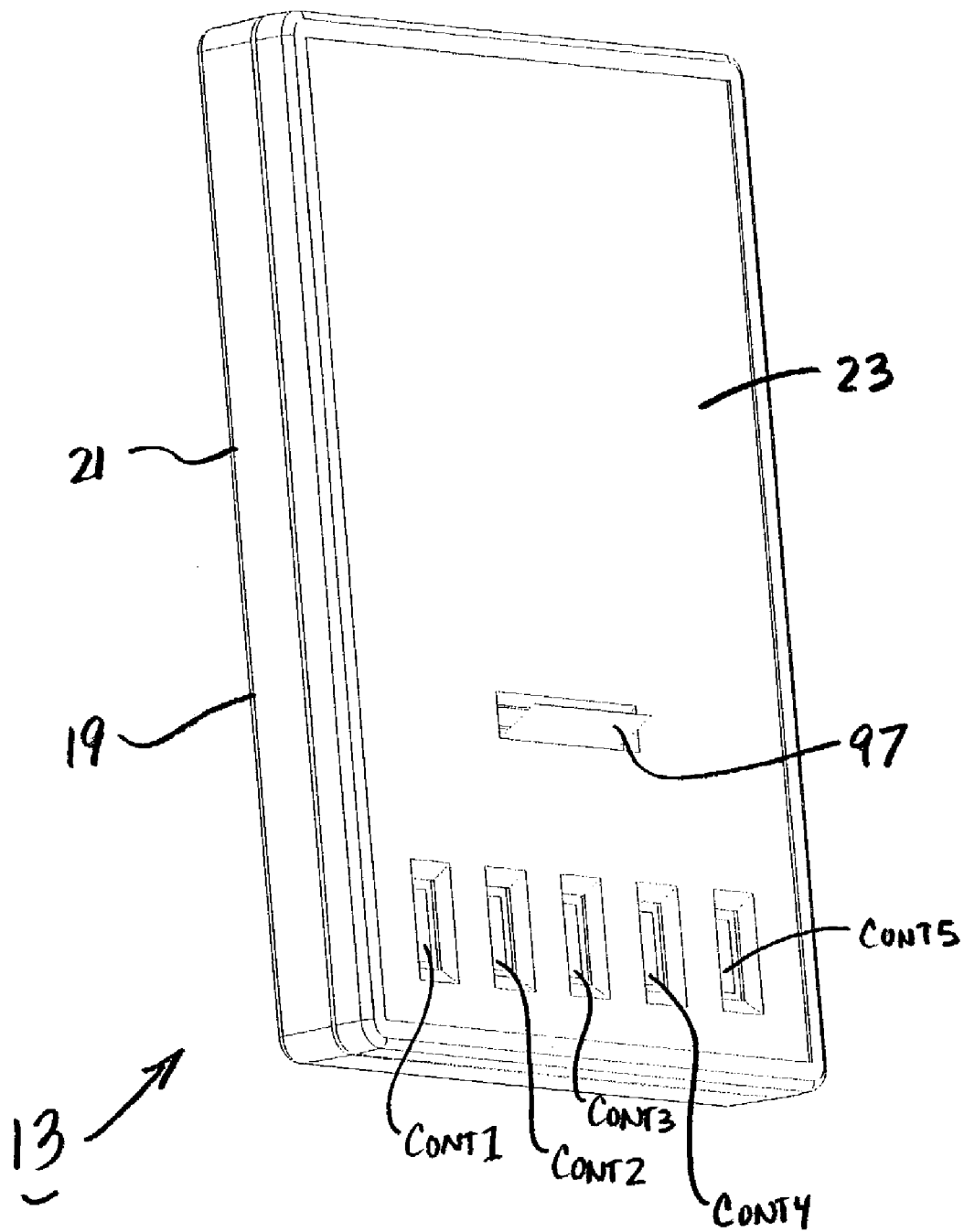
FIG. 3 is an enlarged rear perspective view of the temperature monitoring device shown in FIG. 1.
Figure 4:
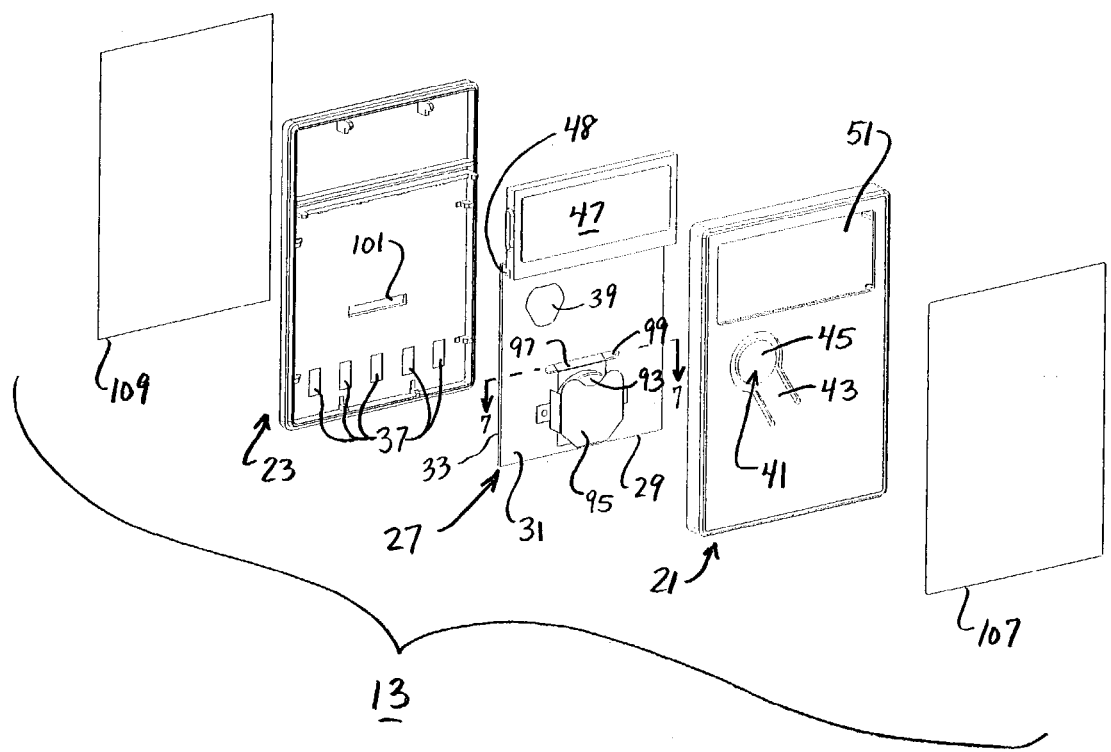
FIG. 4 is an enlarged, exploded, front perspective view of the temperature monitoring device shown in FIG. 1.

Temperature monitoring device 13 is a modular and portable unit which is designed principally for use in monitoring the temperature of an environmentally controlled package. However, it should be noted that device 13 could be modified to monitor alternative types of externally applied parameters (e.g., humidity, mechanical shock and vibration, pH levels, pressure, voltage and current) without departing from the spirit of the present invention. As seen most clearly in FIGS. 2–4, device 13 includes a protective housing 19 constructed of a durable and inexpensive material, such as plastic. Housing 19 includes a front casing 21 and a rear casing 23 which can be secured together by means of a snap-fit interconnection so as to define a substantially enclosed interior cavity 25 therebetween. Constructed in its assembled form, as shown in FIGS. 2 and 3, temperature monitoring device 13 has a length L of approximately 5.6 cm, a width W of approximately 3.9 cm, and a thickness T of approximately 0.6 cm.

Interior cavity 25 of housing 19 is sized and shaped to receive a printed circuit board (PCB) assembly 27 which is responsible for all of the electronic operations of device 13. Printed circuit board assembly 27 comprises a substantially rectangular printed circuit board 29 onto which all of the various electronic and electrical components of PCB assembly 27 are mounted. Printed circuit board 29 is a custom designed, double-sided printed circuit board which includes a front surface 31 and a rear surface 33. As can be appreciated, printed circuit board 29 serves to electrically connect the various electronic and electrical components mounted thereon.

PCB assembly 27 comprises a data communication device 35 which is mounted onto rear surface 33 of printed circuit board 29. Data communication device 35 represents any communication device which is capable of transmitting and receiving serial data. In this capacity, data communication device 35 enables temperature monitoring device 13 to communicate with another communication enabled device, such as adaptor 17. In the present embodiment, data communication device 35 is represented as comprising five, spaced apart contacts which are electrically connected to rear surface 33 of printed circuit board 29, the contacts being identified as contacts Cont1 through Cont5. The contacts are preferably in the form of a plurality of spaced apart, rectangular conductive plates which are externally accessible through a plurality of corresponding vertical slots 37 which are formed into rear casing 23, as seen most clearly in FIGS. 3 and 4.

It should be noted that, although data communication device 35 is represented herein as being in the form of a plurality of conductive plates, data communication device 35 could be represented as being in the form of any other conventional device for transmitting serial data (e.g., an infrared (IR) or radio frequency (RF) transceiver) without departing from the spirit of the present invention.

As can be appreciated, each contact for data communication device 35 electrically transmits and receives signals along an associated line for system 11. Specifically, contact Cont1 electrically connects to the data line DATA for system 11, contact Cont2 electrically connects to the clock line Ck for system 11, contact Cont3 electrically connects to the data direction control line TxH for system 11, contact Cont4 electrically connects to the ready line RDY\ for system 11, and contact Cont5 electrically connects to the return line RET for system 11.

PCB assembly 27 also comprises a conventional dome spring 39 which is mounted onto front surface 31 of printed circuit board 29. Dome spring 39 is constructed of a conductive material and serves to selectively close a normally open switch which is formed into front surface 31 of printed circuit board 29. In this capacity, dome spring 39 serves as means for manually closing the normally open switch formed onto front surface 31 of printed circuit board, as will be described further below. Dome spring 39 is disposed directly behind a pivotally mounted user input device 41 which is cut-out of front casing 21. Specifically, user input device 41 is scored out of front casing 21 so as to define a pivotally mounted arm 43 and a finger actuated, circular button 45 formed onto the free end of arm 43. Constructed in this manner, the application of a depression force onto button 45 causes user input device 41 to inwardly pivot which, in turn, depresses dome spring 39. The depression of dome spring 39 serves to close the normally open switch formed on printed circuit board 29 which is directly beneath dome spring 39. As will be described further below, particular operative functions of temperature monitoring device 13 are activated through the manual depression of button 45. Specifically, depression of button 45 serves to, inter alia, commence the temperature monitoring process for device 13, access the programmed temperature monitoring parameters established for device 13, and access information relating to temperature excursions, or breaches, detected by device 13.

PCB assembly 27 further comprises a display 47 which is electrically mounted onto front surface 31 of printed circuit board 31 through a conventional zebra strip 48. Display 47 is aligned within a rectangular opening, or window, 51 which is formed into front casing 21. As such, display 47 is externally viewable and serves to provide the user with visual information relating to the operation of temperature monitoring device 13.

Figure 5:
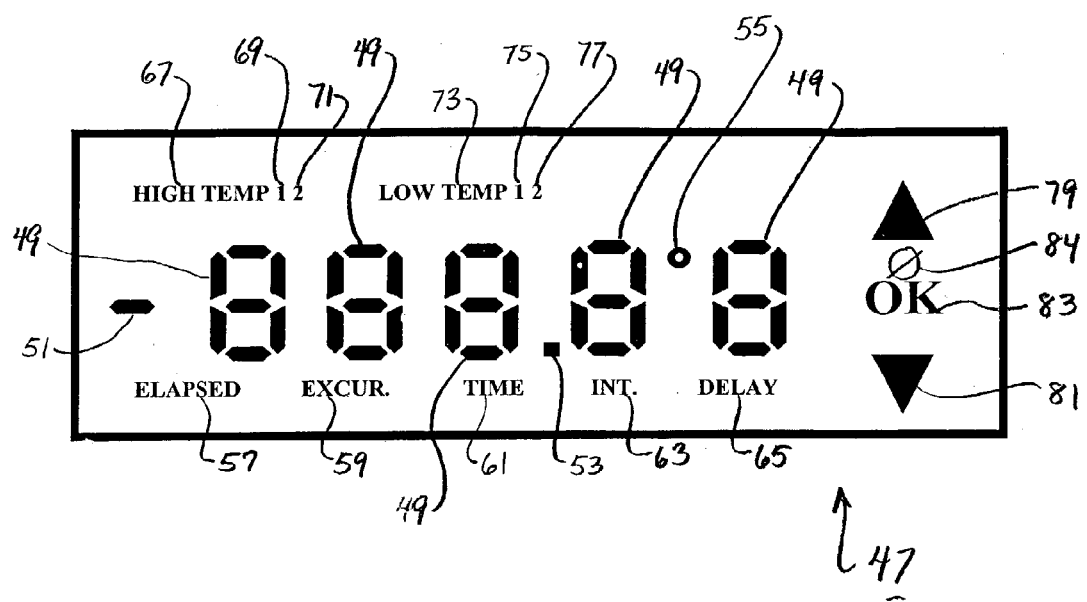
FIG. 5 is an enlarged front plan view of the display for the temperature monitoring device shown in FIG. 1.

Display 47 is represented herein as being in the form of a custom design liquid crystal display (LCD) which can be used to display, inter alia, temperature excursion information and parameter settings. As seen most clearly in FIG. 5, display 47 includes five, seven-segment displays 49, each display 49 capable of representing a number or letter in a digital format. Display 47 also includes a negative sign 51, a decimal point 53, and a degree sign 55. In this capacity, display 47 is capable of displaying a wide variety of phrases and/or numerical values, such as temperature readings.

In addition to the various phrases and numerical values which it can produce, display 47 also includes a plurality of application specific icons and phrases for indicating what type of data is being represented (e.g., whether a numerical value displayed represents the elapsed monitoring time, the excursion temperature, the programmed parameters, etc.). Specifically, display 47 includes an "ELAPSED" icon 57, an "EXCUR." icon 59, a "TIME" icon 61, an "INT." icon 63, and a "DELAY" icon 65.

Furthermore, display 47 further includes a plurality of application specific icons and phrases relating to the details of a detected temperature excursion (e.g., the particular temperature parameter broken during an excursion). Specifically, display 47 includes a "HIGH TEMP" icon 67 immediately followed by a "1" icon 69 and a "2" icon 71, a "LOW TEMP" icon 73 immediately followed by a "1" icon 75 and a "2" icon 77, an icon 79 in the form of an upwardly pointing arrow, an icon 81 in the form of a downwardly pointing arrow, an "OK" icon 83 positioned between icons 79 and 81, and an icon 84 in the form of a circle with a slash therethrough. Icon 84 is preferably positioned above or directly over "OK" icon 83 and serves to represent a negative condition. It should be noted that the particular significance of each icon in display 47 will become more apparent below.

It should be noted that display 47 is not limited to being in the form of a liquid crystal display. Rather, it is to be understood that display 47 could be in the form of alternate types of conventional displays without departing from the spirit of the present invention. For example, it is to be understood that display 47 could alternatively be in the form of a pair of light emitting diodes (LEDs), one LED being red in color and one LED being green in color, without departing from the spirit of the present invention.

The information shown on display 47 is controlled by a central processing unit (CPU) 85 which is mounted onto rear surface 33 of printed circuit board 29. As seen most clearly in FIG. 6, CPU 85 is electrically connected to display 47 via communication bus 87. Similarly, CPU 85 is electrically connected to data communication device 35 via communication bus 89.

CPU 85 is an application specific integrated circuit (ASIC) which controls the principal operations, calculations and data management tasks for temperature monitoring device 13. In particular, CPU 85 includes the custom designed application code which is responsible for controlling the basic operation of temperature monitoring device 13. Preferably, CPU 85 is a 4-bit processor which has a relatively low power requirement (e.g., approximately 0.8 μamp stand-by power requirement and approximately 1.5 μamp running power requirement).

A sensor 91 for monitoring an externally applied parameter is mounted onto rear surface 33 of printed circuit board 29 and is electrically connected to CPU 85. Sensor 91 is represented herein as being in the form of a sensor for monitoring temperature and, more particularly, as being in the form of a temperature sensitive resistor (also referred to simply as a thermistor or temperature sensor herein). However, it is to be understood that sensor 91 represents any device which can be used to monitor an externally applied parameter without departing from the spirit of the present invention. As will be described further below, thermistor 91 is configured to monitor the temperature surrounding the temperature monitoring device 13 and, in turn, electrically transmit the results of each temperature measurement to CPU 85 for analysis in view of the client-specified, temperature monitoring parameters.

Temperature monitoring device 13 preferably derives power from a power source 93 which is mounted on front surface 31 of printed circuit board 29. Power source 93 is preferably in the form of a conventional 3-volt coin cell battery which is electrically connected to CPU 85.

Figure 7:
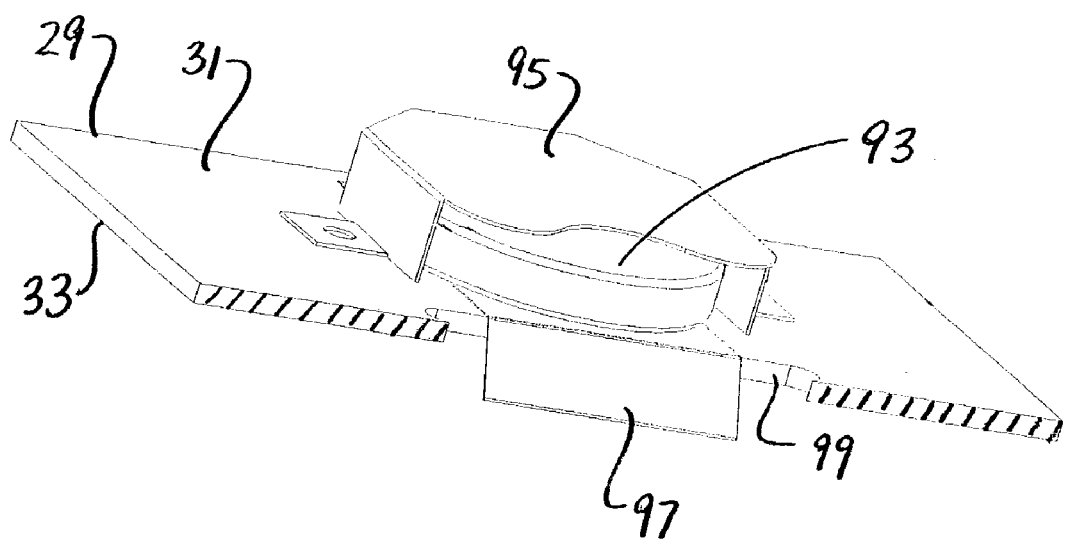
FIG. 7 is an enlarged, perspective, section view of the printed circuit board assembly shown in FIG. 4, taken along lines 7—7.

It should be noted that the technique for mounting power source 93 on printed circuit board 29 also serves as a feature of the present invention. Specifically, as seen most clearly in FIGS. 4 and 7, power source 93 is retained in contact against front surface 31 of printed circuit board 29 by a power source holder, or mount, 95 which is fixedly mounted onto front surface 31. Further, in its initial configuration after completion of construction, device 13 is provided with a power source enable strip 97. Enable strip 97 is in the form of an insulated piece of paper which is disposed between power source 93 and printed circuit board 29, thereby electrically separating power source 93 from associated conductive leads formed on front surface 31 of PCB 29. One end of enable strip 97 is disposed through a lateral slot 99 formed in printed circuit board 29 and, in addition, through a lateral slot 101 formed in rear casing 23. As such, one end of enable strip 97 protrudes out from housing 19 and is externally accessible by the user, as seen most clearly in FIG. 3.

In this capacity, power is supplied to temperature monitoring device 13 in the following manner: In its original construction, enable strip 97 electrically insulates power source 93 from corresponding circuitry formed onto PCB 29. In this condition, no power is supplied to temperature monitoring device 13. In order to supply power to device 13, the user is required to pull on the free end of enable strip 97 until enable strip 97 is withdrawn from device 13. With enable strip 97 withdrawn from device 13, power source 93 is drawn into electrical contact with PCB 29, thereby powering device 13. It should be noted that once power is supplied to device 13, power can not be withdrawn (i.e., device 13 is not provided with a power off switch). In fact, device 13 will continue to operate with power for as long as the lifespan of power source 93 (e.g., approximately 3–6 months). Because it is provided with no means of suspending power, device 13 is less susceptible to tampering, which is highly desirable.

An operation switch 103 is formed on front surface 31 of printed circuit board 29. Operation switch 103 is a normally-open switch which electrically connects power source 93 to a particular pin of CPU 85. Dome spring 39 is disposed directly above operation switch 103. As a result, the activation of user input device 41 depresses dome spring 39 which, in turn, closes operation switch 103. Once operation switch 103 is closed, power supplied from power source 93 is applied to the particular pin for CPU 85. In this manner, the manual activation of user input device 41 can be used, in turn, to perform particular operative functions for temperature monitoring device 13.

A diagnostic jumper switch 105 is similarly formed on printed circuit board 29. Diagnostic jumper switch is a normally-open switch which electrically connects power source 93 to a particular pin of CPU 85. With front casing 21 separated from rear casing 23, diagnostic jumper switch 105 can be shorted to speed up the clock for device 13 in diagnostic testing applications.

Temperature monitoring device 13 additionally comprises front and rear labels 107 and 109, each of labels 107 and 109 being constructed of a water-resistant, transparent plastic (e.g., MYLAR). Together, labels 107 and 109 serve to render device 13 water resistant. Specifically, front label 107 is an adhesive backed label which is mounted on the front surface of front casing 21, label 107 covering window 51 and user input device 41. Rear label 109 is an adhesive backed label which is mounted on the rear surface of rear casing 23, label 109 covering slot 101 and slots 37. However, it is to be understood that rear label 109 is preferably manufactured with a partially applied, removable paper backing which prevents rear label 109 from initially covering slots 37 and 101. Rather, once enable strip 97 has been removed and once device 13 has been properly programmed for operation, the user is required to remove the paper backing and secure rear label 109 onto rear casing 23 over slots 27 and 101 to render device 13 water resistant.

It should be noted that temperature monitoring device 13 is provided with no nonvolatile memory, which is a principal feature of the present invention. In fact, device 13 includes no memory device external to CPU 85. Rather, any memory stored in device 13 is stored within CPU 85. However, CPU 85 has a limited memory capacity (approximately 80 nibbles of RAM) and can only store volatile memory. As a result, device 13 is not capable of storing historical data (i.e., more than one temperature reading at a time) which can subsequently be retrieved. As can be appreciated, the fact that device 13 does not have the capability to store historical data renders device 13 easier to use, less expensive to manufacture, smaller in size, and lighter in weight than conventional temperature monitoring devices which include external memory for storing historical data (i.e., data logger-type temperature monitoring devices).

Figure 8:
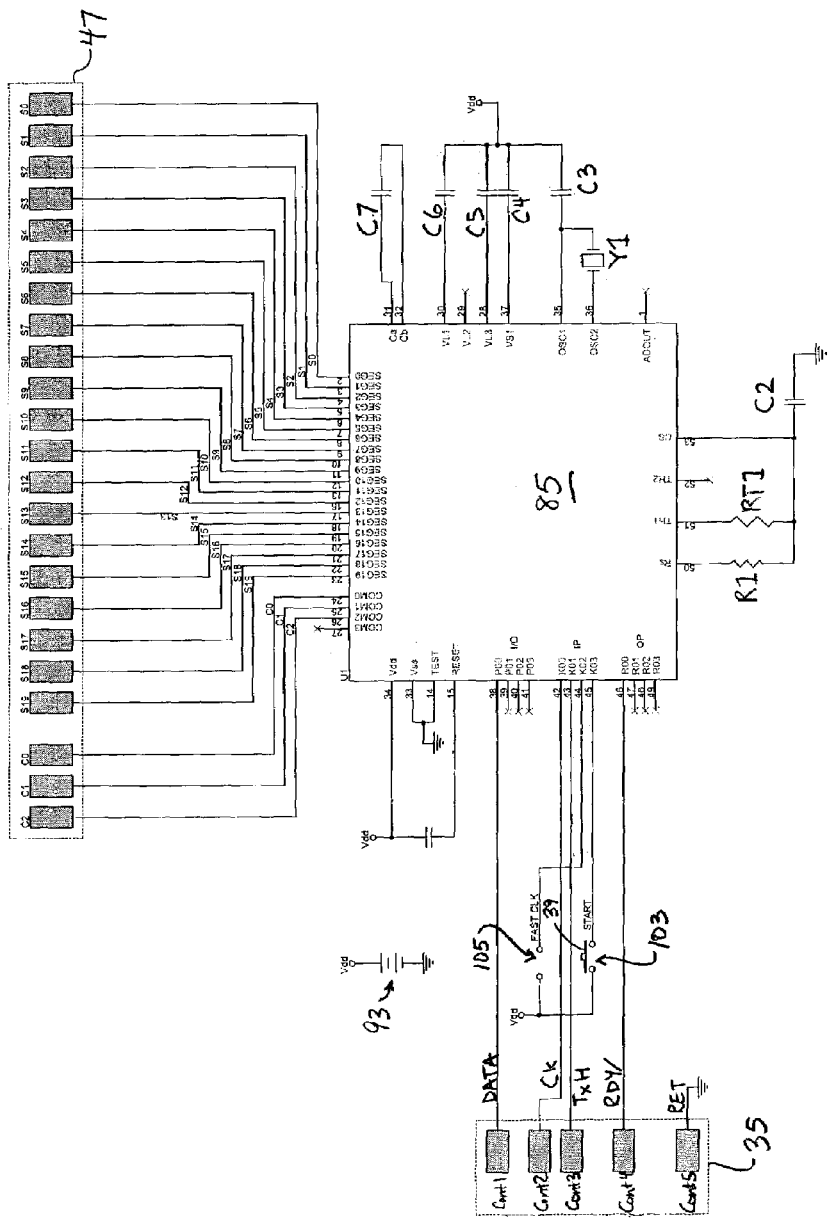
FIG. 8 is a schematic representation of the temperature monitoring device shown in FIG. 1.

A detailed schematic representation of temperature monitoring device 13 is shown in FIG. 8. CPU 85 is preferably a custom design mass program central processing unit which has a model number of S1C60N05.

As can be seen, CPU 85 comprises a plurality of display pins SEG0 through SEG19 which are electrically connected to corresponding contact pads S0 through S19, respectively, for display 47. CPU 85 additionally comprises a plurality of display pins COM0 through COM2 which are electrically connected to corresponding contact pads C0 through C2, respectively, for display 47. In this manner, CPU 85 is capable of directly driving display 47 without the need of a separate controller, which is highly desirable.

CPU 85 comprises a positive supply voltage pin Vdd which is electrically connected to battery 93, a ground pin Vss which is electrically connected to ground, a test pin TEST which is electrically connected to ground, and a reset pin RESET which is electrically connected to battery 93 by a first capacitor C1 which has a value of approximately 1 uF.

CPU 85 comprises an input/output pin P00 which is electrically connected to the data line contact plate Cont1 for data communication device 35. CPU 85 also comprises an input pin K00 which is electrically connected to the clock line contact plate Cont2 for data communication device 35, an input pin K01 which is electrically connected to the data direction control line contact plate Cont3 for data communication device 35, an input pin K02 which is electrically connected to diagnostic jumper switch 105 (which is, in turn, electrically connected to battery 93), and an input pin K03 which is electrically connected to operation switch 103 (which is, in turn, electrically connected to battery 93). CPU 85 additionally comprises an output pin R00 which is electrically connected to the ready line contact plate Cont4 for data communication device 35. Further, the return line contact plate Cont5 for data communication device 35 is connected to ground. In this manner, CPU 85 is able to transmit and receive serial data with adaptor 17 along the five transmission lines for system 11 via data communication device 35.

CPU 85 comprises a resistor pin Rs which is electrically connected to a resistor R1 which has a value of approximately 10 Kohms and a thermistor pin TH1 which is electrically connected to thermistor 91. The free ends of resistor R1 and thermistor 91 are connected to a capacitor pin Cs for CPU 85 and a capacitor C2 which, in turn, is connected to ground, capacitor C2 having a value of approximately 2200 pF. In this manner, CPU 85 is capable of retrieving temperature measurements sensed by thermistor 91.

CPU 85 also includes a crystal input pin OSC1 and a crystal output pin OSC2 which are connected together by a crystal Y1 which has a value of approximately 32.768 KHz. Crystal input pin OSC1 is additionally electrically connected to a capacitor C3 having a value of approximately 10 pF, capacitor C3, in turn, being connected to battery 93. In this manner, CPU 85 provided with time measurement capabilities.

CPU 85 further includes a pin VS1 which is electrically connected to a capacitor C4 having a value of approximately 0.1 uF, a pin VL3 which is electrically connected to a capacitor C5 having a value of approximately 0.1 uF, and a pin VL1 which is electrically connected to a capacitor C6 having a value of approximately 0.1 uF, wherein the free ends of capacitors C4, C5 and C6 are all connected to battery 93. In addition CPU 85 includes a pin Ca and a pin Cb which are electrically connected by a capacitor C7 which has a value of approximately 0.1 uF. In this manner, CPU 85 is able to generate the necessary voltages to drive the various panels for display 47.

Data programming device (DPD) 15 is represented in FIG. 1 as being in the form of a communication enabled laptop computer. As such, data programming device 15 is capable of serial data transfer with another device, such as adaptor 17, through a conventional data communication channel 111, as will be described further below. Preferably, data programming device 15 is provided with user-friendly software which facilitates programming temperature monitoring device 13 with client-specified, temperature monitoring parameters.

Although data programming device 15 is represented herein as being in the form of a conventional laptop computer, it is to be understood that data programming device 15 is not limited to a conventional laptop computer. Rather, it is to be understood that data programming device 15 could be in the form of other types of communication enabled data programming devices (e.g., a desktop computer, personal data assistant (PDA), etc.) without departing from the spirit of the present invention.

Adaptor 17 is a modular, self-contained unit which is adapted to removably receive one or more temperature monitoring devices 13. As will be described further in detail below, adaptor 17 is adapted to communicate with data programming device 15 by means of data communication channel 111 and is adapted to communicate with temperature monitoring device 13 by means of a data communication channel 113. In this capacity, adaptor 17 can be used to enable data programming device 15 to program one or more temperature monitoring devices 13.

Figure 9:
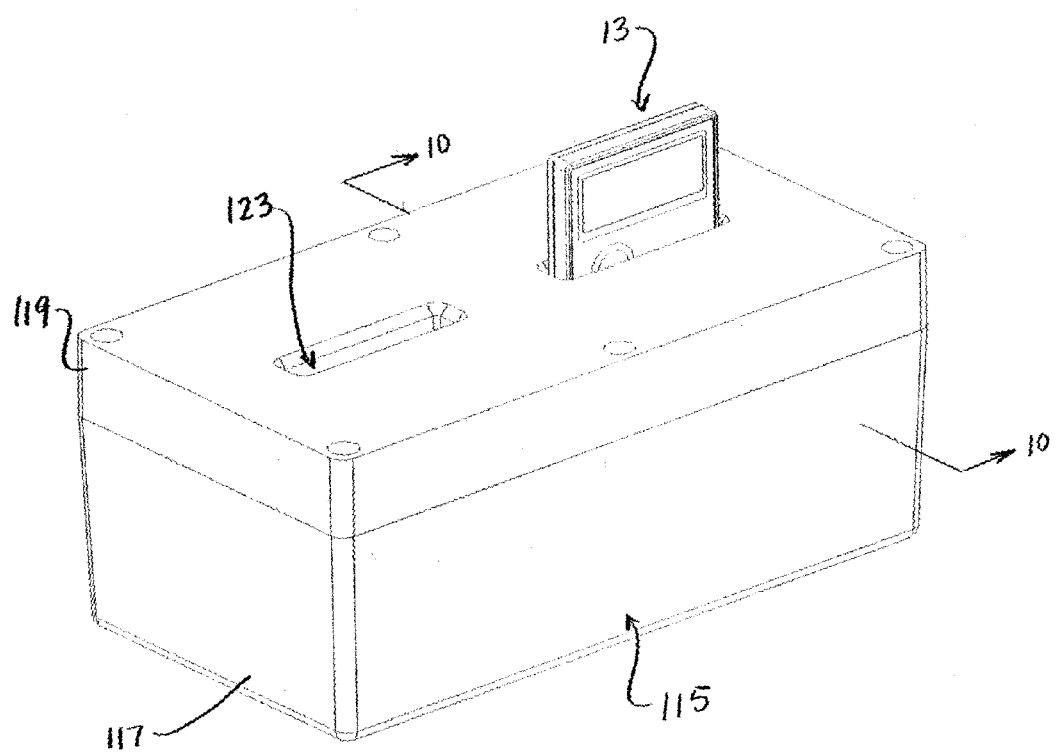
FIG. 9 is an enlarged front perspective view of the temperature monitoring device and adaptor shown in FIG. 1.

As seen most clearly in FIG. 9, adaptor 17 comprises a protective box-shaped housing 115 constructed of a durable and inexpensive material, such as plastic. Housing 115 includes a bottom casing 117 and a top casing 119 which can be releasably secured together by means of six socket head cap screws (not shown) so as to define a substantially enclosed interior cavity 121 therewithin.

Top casing 119 is provided with a pair of lateral slots 123 which are in communication with interior cavity 121. Each slot 123 is sized and shaped to fittingly receive an associated temperature monitoring device 13. As will be described further in detail below, proper insertion of a temperature monitoring device 13 within an associated slot 123 serves to establish a serial data communication line 113 between said temperature monitoring device 13 and adaptor 17.

Adaptor 17 is shown herein as comprising a pair of slots 123 to allow for the simultaneous programming of two temperature monitoring devices 13. However, it should be noted that adaptor 17 is not limited to a pair of slots 123. Rather, it is to be understood that adaptor 17 could be constructed to include a greater or fewer number of slots 123 without departing from the spirit of the present invention.

A pair of stops 125 is fixedly mounted on housing 115 within interior cavity 121 on opposite sides of each slot 123. Each stop comprises a rubber washer 127 which serves to limit the insertion of a temperature monitoring device 13 within an associated slot 123, as can be seen most clearly in FIG. 10.

Interior cavity 121 is also sized and shaped to receive a printed circuit board assembly (not shown) which is responsible for all of the serial data transfer operations of adaptor 17. The printed circuit board assembly includes a printed circuit board (not shown) onto which all of the various electronic and electrical components of the printed circuit board assembly are mounted, the printed circuit board serving to electrically connect the various electronic and electrical components mounted thereon.

The printed circuit board assembly for adaptor 17 comprises a data communication device 129 which is electrically coupled to the printed circuit board. Data communication device 129 represents a communication device which is capable of transmitting and receiving serial data.

Figure 6:
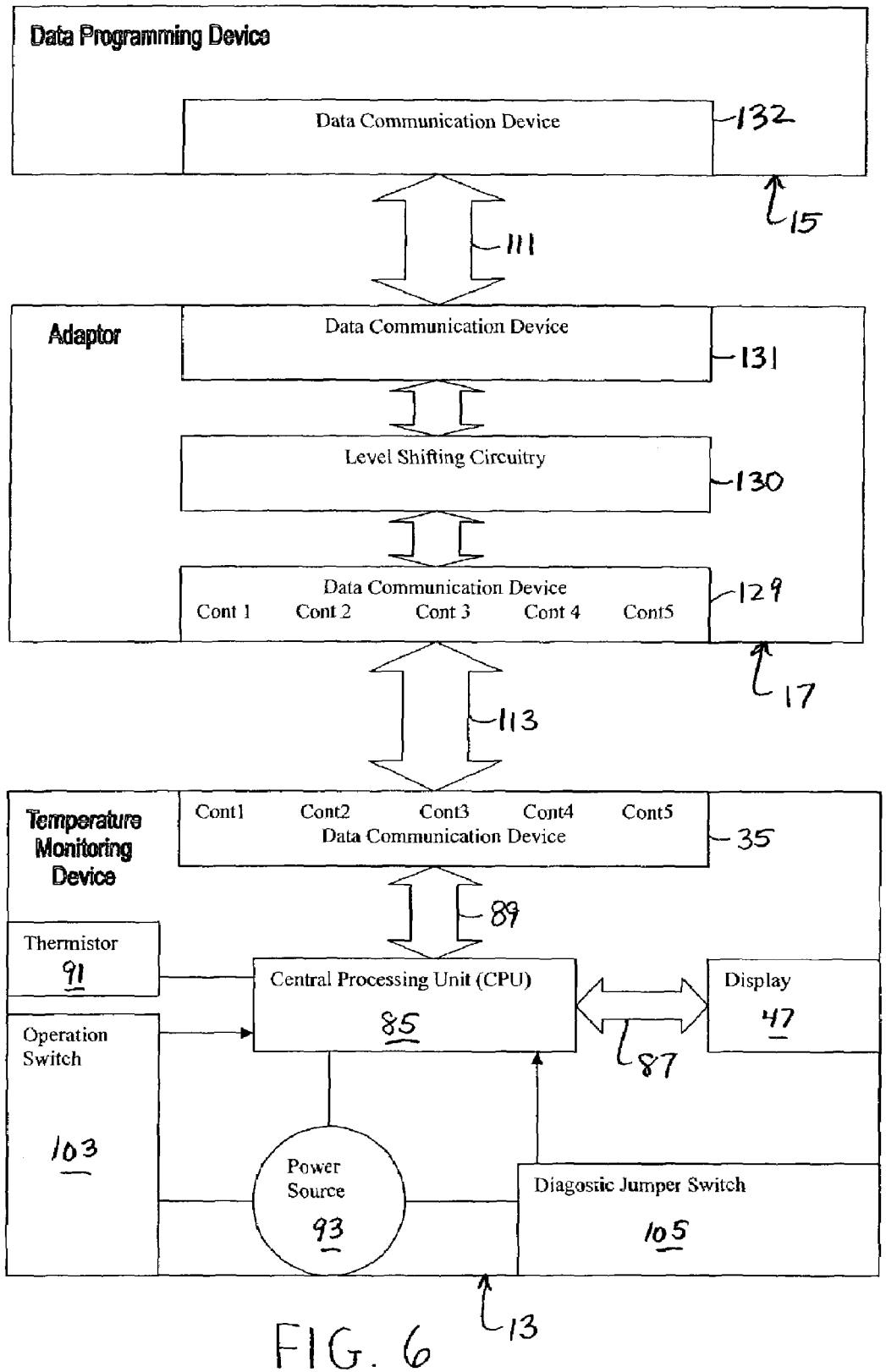
FIG. 6 is a simplified block diagram of the system shown in FIG. 1.

In the present embodiment, data communication device 129 is represented as comprising five, spaced apart conductive spring contacts which are fixedly mounted on the underside of top casing 119, the contacts being identified as contacts Cont1 through Cont5 in FIG. 6. Each contact for data communication device 129 electrically transmits and receives signals along an associated line for system 11. Specifically, contact Cont1 electrically connects to the data line DATA for system 11, contact Cont2 electrically connects to the clock line Ck for system 11, contact Cont3 electrically connects to the data direction control line TxH for system 11, contact Cont4 electrically connects to the ready line RDY\ for system 11, and contact Cont5 electrically connects to the return line RET for system 11.

Figure 10:
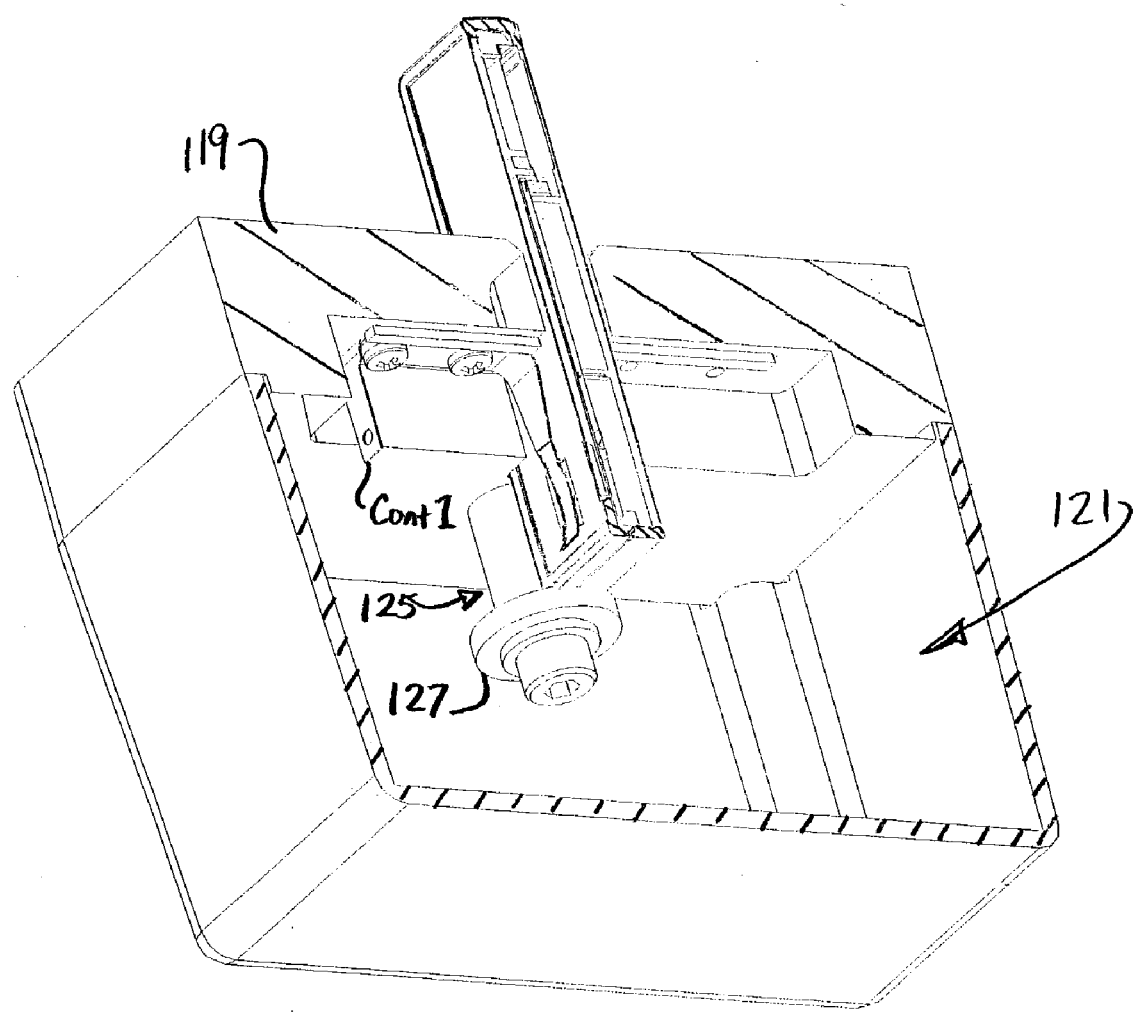
FIG. 10 is a perspective, section view of the temperature monitoring device and adaptor shown in FIG. 9, taken along lines 10—10.

As seen most clearly in FIG. 10, with temperature monitoring device 13 properly inserted into a corresponding slot 123, each spring contact affixed to the underside of top casing 119 is constructed to directly contact an associated conductive plate in temperature monitoring device 13, thereby establishing a conductive path between data communication device 35 and data communication device 129. As a result, the connection between data communication device 35 and data communication device 129 allows for bi-directional, bit sequential, serial data communication line 113 to be established between temperature monitoring device 13 and adaptor 17.

The printed circuit board assembly for adaptor 17 also comprises level shifting circuitry 130 which is electrically connected to data communication device 129. Level shifting circuitry 130, in turn, is electrically connected to a data communication device 131. In the present embodiment, data communication device 131 is represented as a parallel port connector. Similarly, data programming device 15 includes a data communication device 132 which is in the form of a parallel port connector. As such, connection between data communication device 131 and data communication device 132 using a parallel port connector hardwire link serves to create a bi-directional, bit sequential, serial data communication line 111 between data programming device 15 and adaptor 17.

It is to be understood that data communication devices 131 and 132 are not limited to parallel printer port connectors. Rather, it is to be understood that data communication devices 131 and 132 could be in the form of alternative types of conventional connectors (e.g., serial port connectors, USB port connectors, etc.) without departing from the spirit of the present invention.

Figure 11:
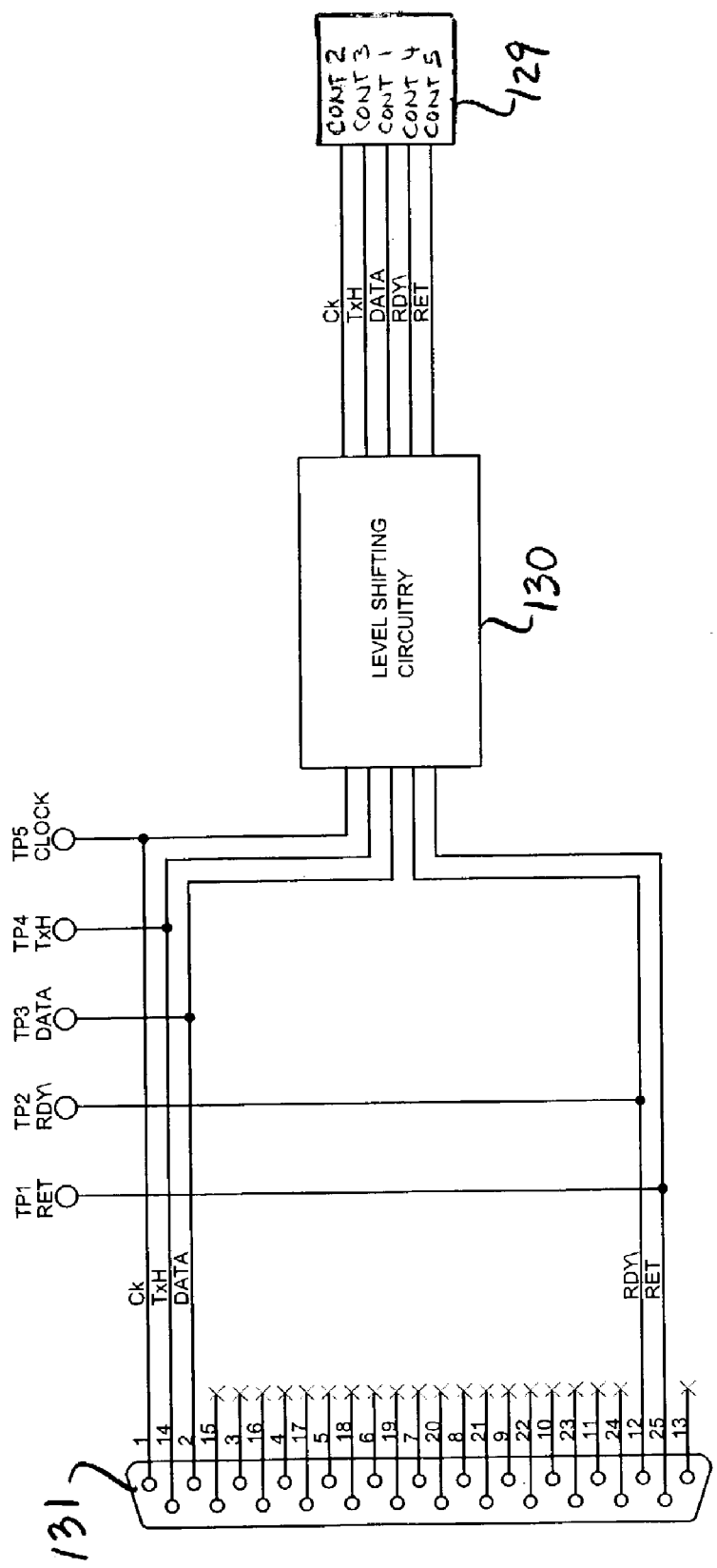
FIG. 11 is a schematic representation of the adaptor shown in FIG. 1.

A detailed schematic representation of adaptor 17 is shown in FIG. 11. Specifically, each of the five contacts of data communication device 129 is electrically connected to level shifting circuitry 130. In turn, level shifting circuitry 130 is connected to a clock line pin 1, a data direction control line pin 14, a data line pin 2, a ready line pin 12, and a return line pin 25 for data communication device 131.

Figure 12:
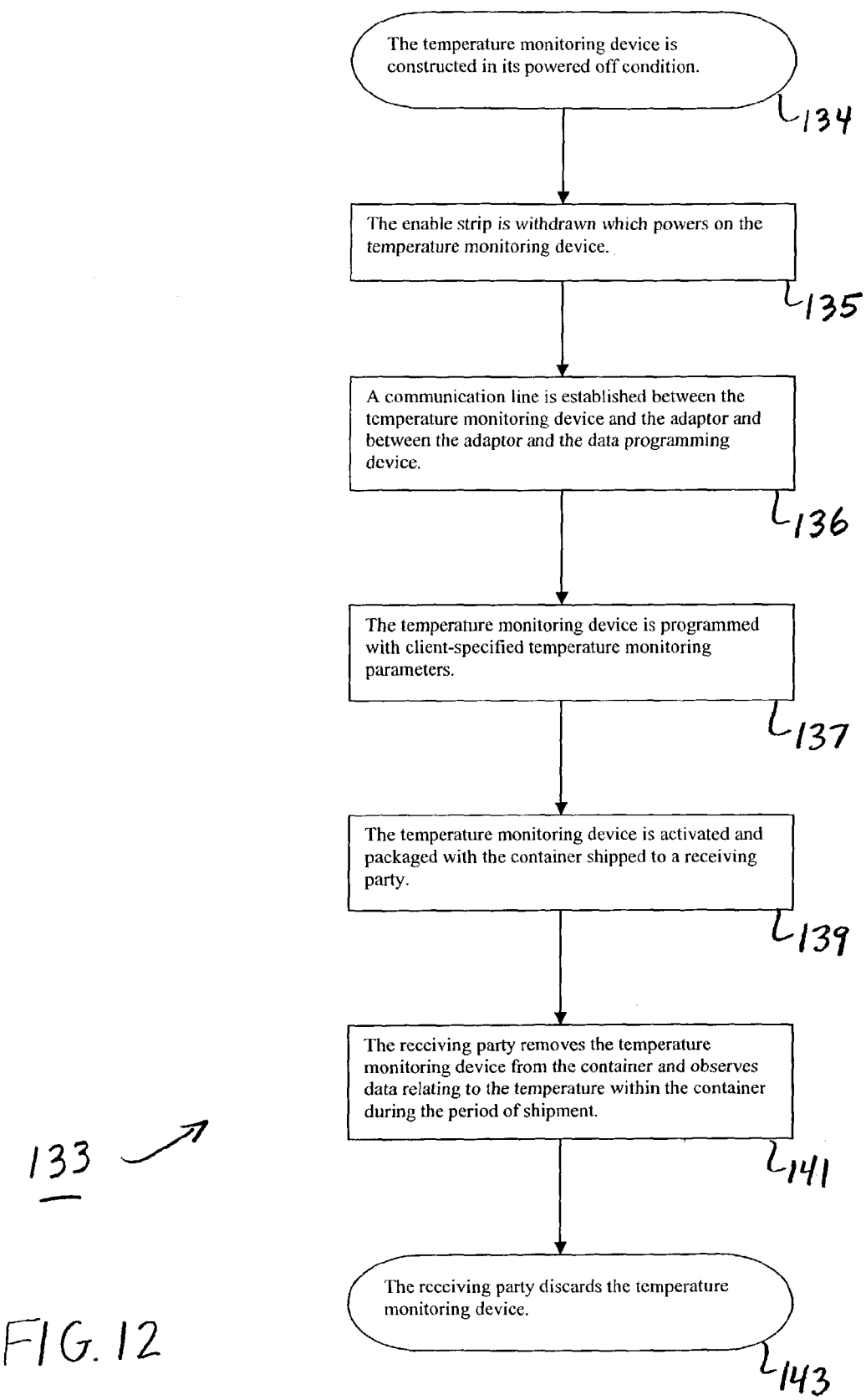
FIG. 12 is a flow chart depicting a method of operating the system shown in FIG. 1.

In use, temperature monitoring system 11 can be used in the following manner to monitor the internal temperature of a temperature controlled package (or any other conventional container), said method of operation for system 11 being represented generally by reference numeral 133 in FIG. 12.

In its original configuration after completion of manufacture, temperature monitoring device 13 comprises a power source 93 which is electrically insulated from printed circuit board 29. As a result, no power is supplied to CPU 85, thereby rendering temperature monitoring device 13 inert, or powered off, reference numeral 134 representing device 13 in its inert condition. Preferably, with temperature monitoring device 13 powered off, display 47 is blank.

In order to program temperature monitoring device 13 for use, enable strip 97 is withdrawn from interior cavity 25 of housing 19, said withdrawing step being represented generally by reference numeral 135. The withdrawal of enable strip 97 enables power source 93 to electrically contact printed circuit board 29 which, in turn, causes CPU 85 to initialize its processing. In response to its initialization, CPU 85 causes the decimal point icon 53 on display 47 to turn on and continuously stay on. It should be noted that, after step 135, temperature monitoring device 13 remains powered on for the lifespan of power source 93, thereby rendering device 13 less susceptible to tampering.

With temperature monitoring device 13 powered up, the three principal components of system 11 are interconnected in step 136. Specifically, temperature monitoring device 13 is inserted into a corresponding slot 123 in adaptor 17, thereby establishing communication line 113 between temperature monitoring device 13 and adaptor 17. In addition, a hardwire link is connected to data communication device 131 and data communication device 132, thereby establishing communication line 111 between data programming device 15 and adaptor 17. In this manner, the transmission of serial data is possible between data programming device 15 and temperature monitoring device 13 via adaptor 17.

With data programming device 15 linked to temperature monitoring device 13, data programming device 15 is used to program the particular, client-specified temperature monitoring parameters for temperature monitoring device 13, said programming step being represented by reference numeral 137. Once temperature monitoring device 13 has been successfully programmed, CPU 85 causes the decimal point icon 53 on display 47 to blink, or flash, at a 1 Hz rate (i.e., alternating 1 second on and 1 second off). In response to icon 53 flashing, the paper backing from rear label 109 is removed and label 109 is adhered against rear casing 23 over slots 37 and 101, thereby rendering device 13 water resistant.

It should be noted that, immediately after having been programmed, temperature monitoring device 13 takes a diagnostic temperature reading and transmits the results of said reading to data programming device 15. The results of said temperature reading are analyzed by data programming device 15 to ensure that temperature monitoring device 13 is properly functioning. If the software loaded on the data programming device 15 determines the diagnostic temperature measurement to be accurate, data programming device 15 will indicate proper functioning on its screen. To the contrary, if the software loaded on the data programming device 15 determines the diagnostic temperature measurement to be inaccurate, an appropriate message will appear on the screen of data programming device 13 (e.g., err3) which would note to the client to discard temperature monitoring device 13.

Temperature monitoring device 13, having been programmed with particular, client-specified temperature tracking parameters, is then ready to monitor the temperature within a package during a shipment period. In order for temperature monitoring device 13 to commence tracking the temperature within a particular package using the client-specified temperature monitoring parameters, the shipping party depresses button 45 of user input device 41 for greater than four seconds and packages temperature monitoring device 13 within the climate controlled container, said activation/packaging step being represented by reference numeral 139. In this manner, temperature monitoring device 13 is activated to track the temperature within the climate controlled container based upon the user-defined temperature tracking parameters.

It should be noted that temperature monitoring device 13 can be programmed to include a delay period prior to its temperature monitoring process. As a result, when temperature monitoring device 13 is programmed to incorporate a delay, the monitor will wait the appropriate delay period before commencing temperature monitoring activities. In this manner, the shipper is provided with ample time to package device 13 within the climate controller container and allow said container to reach its target temperature range. With temperature monitoring device 13 operating in its delay mode, together "OK" icon 83 and "DELAY" icon 65 blink at a 1 Hz rate (i.e., both flashing at 1 second on and 1 second off). Simultaneously, displays 49 sequentially count down the remaining time left during the delay period.

Having activated temperature monitoring device 13 in step 139, the shipping party transports the climate controlled package to the receiving party. Upon receiving the package, the receiving party can view the display 47 for temperature monitoring device 13. As will be described further in detail below, display 47 provides particular indicators to notify the receiving party whether a temperature excursion was detected during the monitoring period. In addition to viewing the foregoing information, the receiving party can also view more detailed information relating to, inter alia, a detected temperature excursion and the client-specified temperature parameters, said viewing steps being referred to by reference numeral 141.

Having extracted all the desired information from temperature monitoring device 13 in step 141, the receiving party can then discard the disposable temperature monitoring device 13, said discarding step being represented by reference numeral 143.

The particular method in which temperature monitoring device 13 tracks the temperature within a climate controlled container is described further in detail herewith. However, prior to a discussion of how device 13 performs a programmed monitoring process, a brief discussion of the particular temperature monitoring parameters which can be established for a tracking program are discussed below.

Figure 13:
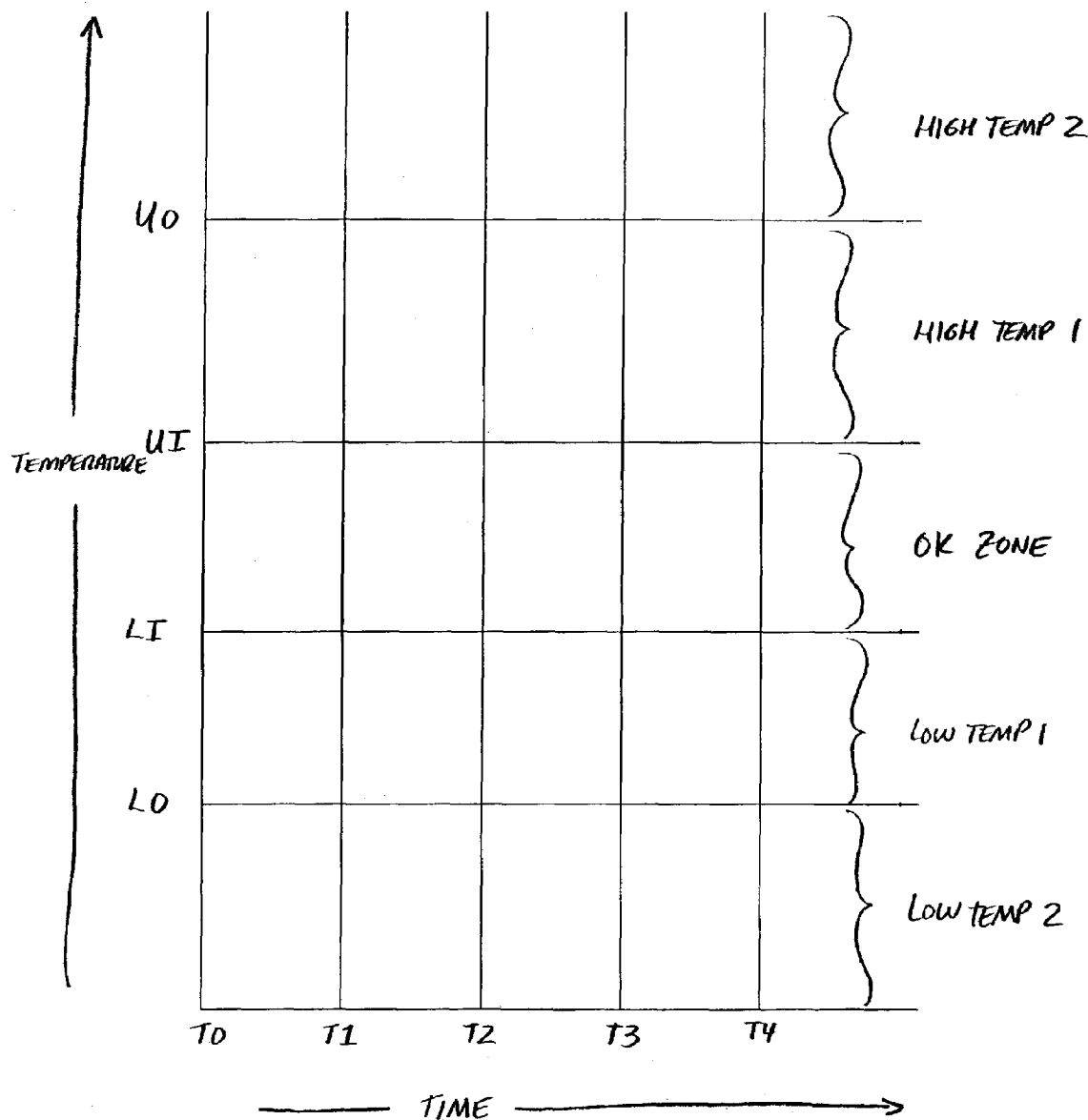
FIG. 13 is a graph useful in understanding the particular temperature monitoring parameters which can be programmed into the temperature monitoring device shown in FIG. 1.

Referring now to FIG. 13, there is shown a graph useful in understanding the particular temperature monitoring parameters which can be programmed into temperature monitoring device 13. For temperature sensitive articles, a shipper desires to transport a product within a climate controlled container. The product to be shipped often includes specified conditions relating to the temperature within the container to which the product can be exposed. Specifically, it is desired that the product be maintained within a target temperature range. The target temperature range for the product falls between an upper inner temperature UI and a lower inner temperature LI, said range being identified generally as the OK ZONE. The product also includes a first high temperature range HIGH TEMP1 which is defined by any temperature falling between inner temperature UI and an upper outer temperature UO. The product additionally includes a second high temperature range HIGH TEMP2 which is defined by every temperature which is greater than upper outer temperature UO. The product further includes a first low temperature range LOW TEMP1 which is defined by any temperature falling between lower inner temperature LI and a lower outer temperature LO. The product also includes a second low temperature range LOW TEMP2 which is defined by any temperature falling beneath lower outer temperature LO.

The target temperature range, defined as the OK ZONE, is the desired temperature range to which the product should be exposed.

The first high temperature range HIGH TEMP1 is a temperature range which is higher than the target temperature range to which the product should be exposed. However, often a particular product is capable of withstanding exposure to temperatures falling within first high temperature range HIGH TEMP1 for a defined cumulative period. Stated another way, it is often deemed acceptable for the product to be exposed to temperatures within the first high temperature range HIGH TEMP1 as long as the product is not exposed to said temperatures for a cumulative period of time which is greater than a specified period.

Similarly, the first low temperature range LOW TEMP1 is a temperature range, which is lower than the target temperature range to which the product should be exposed. However, often a particular product is capable of withstanding exposure to temperatures falling within first low temperature range LOW TEMP1 for a defined cumulative period. Stated another way, it is often deemed acceptable for the product to be exposed to temperatures within the first low temperature range LOW TEMP1 as long as the product is not exposed to said temperatures for a cumulative period of time which is greater than a specified period.

The second high temperature range HIGH TEMP2 is an unacceptable temperature range under all conditions. As a result, if the product is exposed to a temperature which falls within the second high temperature range HIGH TEMP2, a temperature excursion is said to have been met and the shipment of the product is deemed a failure.

The second low temperature range LOW TEMP2 is an unacceptable temperature range under all conditions. Specifically, if the product is exposed to a temperature which falls within the second low temperature range LOW TEMP2, a temperature excursion is said to have been met and the shipment of the product is deemed a failure.

Figure 14:
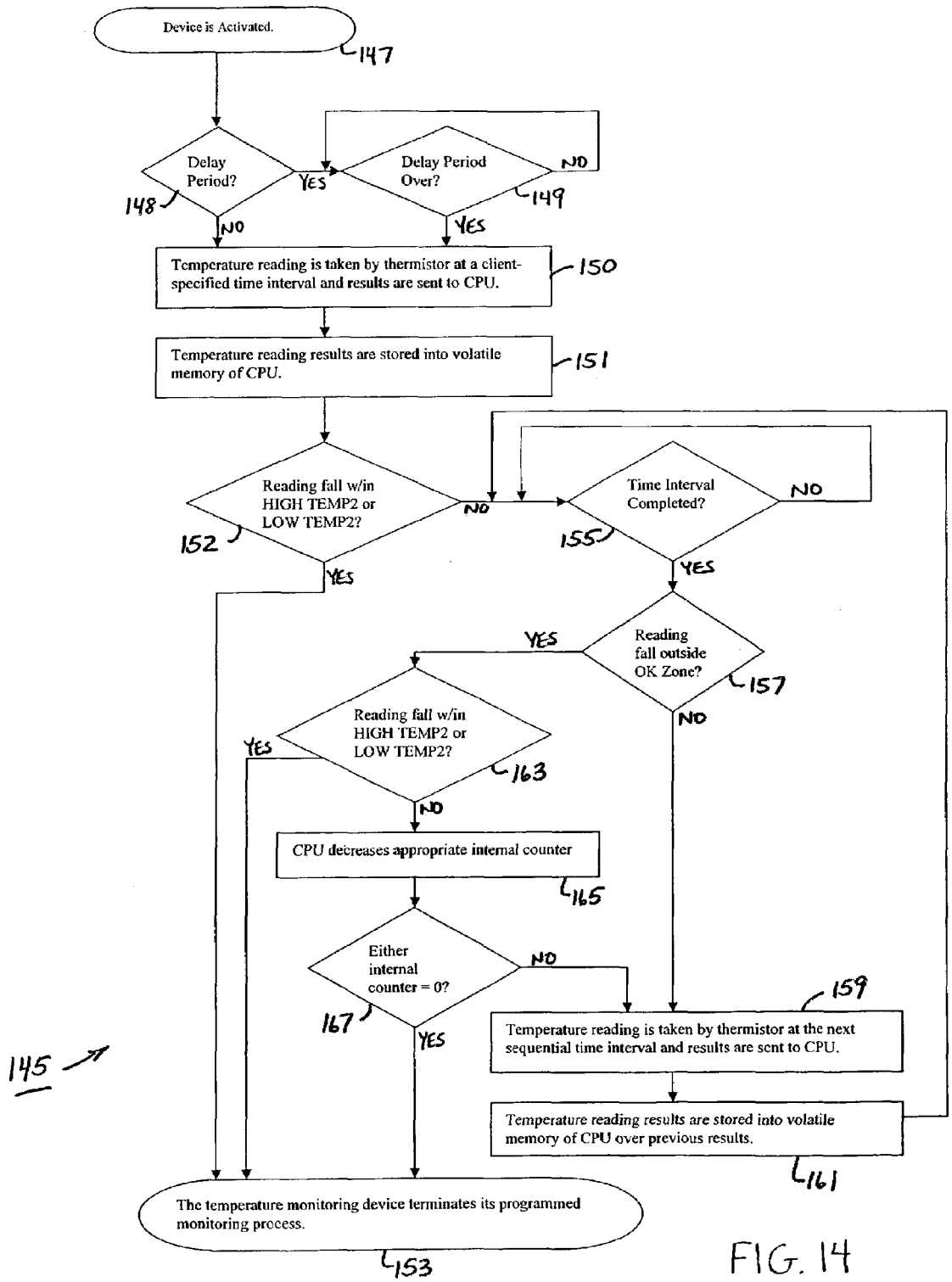
FIG. 14 is a flow chart depicting the method in which the temperature monitoring device shown in FIG. 1 performs a programmed monitoring process.

Accordingly, referring now to FIG. 14, there is shown a flow chart depicting a method in which temperature monitoring device 13 carries out a programmed temperature monitoring process, the method being identified generally by reference numeral 145. As noted above, temperature monitoring device 13 is programmed with particular temperature tracking parameters. Some of the particular client-specified parameters with which device 13 can be programmed include, inter alia, the time intervals in which device 13 is to measure the temperature within the container (e.g., 15 minute intervals), the values of the lower outer temperature LO, lower inner temperature LI, upper inner temperature UI, and upper outer temperature UO, the allowable cumulative time period in which the product can be exposed to temperatures which fall within each of the first high temperature HIGH TEMP1 and the first low temperature LOW TEMP1, the length of the delay period (if any), and the unit of measurement of temperature readings (i.e., Celsius or Fahrenheit).

In order to commence method 145, temperature monitoring device 13 is activated in step 147. After having been activated, CPU 85 of device 13 determines whether a delay period is to be observed in step 148. As noted above, a delay period provides the shipping party with time to package device 13 and the desired product within the climate controlled packaging. If, in fact, device 13 has been programmed to incorporate a delay period, CPU 85 determines at each successive time increment whether the delay period has completed in step 149. Once CPU 85 determines that the delay period is over (i.e., at T0) or, in the alternative, if device 13 is not programmed to incorporate a delay period, temperature monitoring device 13 commences its temperature tracking utility.

Specifically, at time T0, thermistor 91 measures the temperature within the container in a measuring step 150. The results of said measurement (e.g., the temperature reading as well as the elapsed time) are then stored into the volatile memory of CPU 85, said storing step being identified generally by reference numeral 151. In step 152, CPU 85 immediately analyzes whether the measured temperature at T0 falls within second high temperature range HIGH TEMP2 or second low temperature range LOW TEMP2.

If the measured temperature falls within second high temperature range HIGH TEMP2 or second low temperature range LOW TEMP2, CPU 85 instantly determines that there has been a temperature excursion, or breach, within the container. As a result, CPU 85 immediately instructs display 47 to indicate a temperature excursion. Preferably, the failure is represented on display 47 by simultaneously flashing "OK" icon 83 with icon 84 at a 1 Hz rate. In addition, icon 79 or icon 81 flashes at a 1 Hz rate depending on whether the excursion was high or low, respectively. In addition, device 13 terminates its programmed temperature measurement operation, as represented by reference numeral 153.

If the measured temperature at T0 does not fall within second high temperature range HIGH TEMP2 or second low temperature range LOW TEMP2, CPU 85 immediately instructs display 47 to indicate a temporarily acceptable temperature condition. Specifically, CPU 85 causes "OK" icon 83 (without icon 84) to flash at a 1 Hz rate.

At the completion of each successive time increment, CPU 85 determines whether the elapsed time matches the user-specified time interval parameters, said determination step being referred to generally by reference numeral 155. Once CPU determines that elapsed time interval matches the user-specified parameters (i.e., at T1), CPU 85 analyzes the temperature value stored in its volatile memory (i.e., the temperature value measured at T0). CPU 85 then determines whether said value falls outside the target zone OK ZONE, said analyzing step being represented by reference numeral 157.

If CPU 85 determines that said value does not fall outside the target zone OK ZONE (i.e., if the value falls within the target zone OK ZONE), CPU 85 instructs thermistor 91 to take a second temperature reading, said temperature reading step being identified by reference numeral 159. The results of said second temperature reading (e.g., the temperature measurement as well as the elapsed time) are, in turn, stored into the volatile memory of CPU 85, said storing step being represented by reference numeral 161. Specifically, in step 161, CPU 85 takes the values associated with the second temperature measurement and stores said values in the volatile memory for CPU 85 over said first temperature reading. Stated another way, said first temperature reading stored in volatile memory for CPU 85 is overwritten with said second temperature reading. Because device 13 does not include any data storage devices (e.g., non-volatile memory) external to CPU 85, device 13 is capable of storing only one temperature reading at a time, thereby precluding device 13 from accumulating historical data relating to more than one temperature reading.

If the value of the measured temperature acquired at T0 falls outside the target zone OK ZONE, CPU 85 then determines whether the measured temperature falls within second high temperature range HIGH TEMP2 or second low temperature range LOW TEMP2, said determining step being identified by reference numeral 163. If, in fact, the measured temperature falls within second high temperature range HIGH TEMP2 or second low temperature range LOW TEMP2, CPU 85 instantly determines that there has been a temperature excursion, or breach, within the container. As a result, method 145 proceeds directly to step 153 (in which device 13 terminates its programmed temperature measurement operation).

It should be noted that, when method 145 proceeds to step 153, the data stored in the volatile memory of CPU 85 is preserved (i.e., no future data will overwrite the data stored in the volatile memory). As a result, the stored data (namely, the elapsed time and the temperature measurement at the time of breach) are automatically preserved for the lifespan of power source 93.

If the measured temperature does not fall within second high temperature range HIGH TEMP2 or second low temperature range LOW TEMP2, CPU 85 decreases an appropriate internal counter one increment, said decreasing step being represented by reference numeral 165. Specifically, if the measured temperature falls within first high temperature range HIGH TEMP1, CPU 85 decreases a corresponding first high temperature range internal counter one increment. Similarly, if the measured temperature falls within first low temperature LOW TEMP1, CPU 85 decreases a corresponding first low temperature range internal counter one increment. It should be noted that the initial value associated with each internal counter is one of the client-specified, temperature monitoring parameters which are programmed into device 13.

Having decreased an appropriate internal counter one increment in step 165, CPU 85 then analyzes whether either of the internal counters for first high temperature range HIGH TEMP1 or first low temperature range LOW TEMP1 equals zero, said analyzing step being identified by reference numeral 167. If one of said internal counters equals zero (thereby signifying a temperature excursion), CPU 85 causes display 47 to indicate a temperature excursion and then proceeds to step 153 (where device 13 terminates its temperature measuring process).

As an example, if each time period represents 15 minutes and if the user specifies that the product can be exposed to temperatures falling within the first high temperature range HIGH TEMP1 for 1 hour, the internal counter for the first high temperature range will initially be set at 4. Once the internal counter in CPU 85 which is associated with the first high temperature range reaches zero, device 13 proceeds to step 153 because a temperature excursion, or failure condition, in the first high temperature range HIGH TEMP 1 has been met.

In the alternative, if CPU 85 determines that a temperature excursion has not been met in step 167, CPU 85 proceeds to step 159 and method 145 continues.

It should be noted that, in the manner described above, device 13 operates using a (T−1) methodology. Specifically, CPU 85 analyzes temperature data acquired by thermistor 91 during its next sequential time interval. For example, temperature data accumulated at T0 will be analyzed by CPU 85 at its next sequential time interval T1. As a result of this delay, device 13 is prevented from erroneously reading a temperature measurement as the climate controlled package is opened by the receiving party, or shortly thereafter.

Once device 13 reaches the receiving party, the success of the shipment can be readily determined by viewing display 47. If successful, "OK" icon 83 will continue to flash at a 1 Hz rate. If a temperature excursion occurred, the "OK" icon 83, the circle-slash icon 84 and one of arrow icons 79 and 81 will flash at a 1 Hz rate to indicate a failure.

To retrieve more detailed information relating to the temperature measurements taken, the receiving party is required to depress button 45 of user input device 41 for a period greater than approximately 1 second and a period less than approximately 4 seconds. If device 13 has not detected a temperature excursion, CPU 85 controls display 47 to continuously flash the "OK" icon 83 at a 1 Hz rate. Simultaneously, CPU 85 controls display to first show the temperature located in its volatile memory for four seconds and then show the elapsed time registered in the volatile memory for four seconds. If device 13 has detected a temperature excursion, CPU 85 controls display 46 to continuously flash the "OK" icon 83, the circle-slash icon 84 and one of arrow icons 79 and 81 at a 1 Hz rate. Simultaneously, CPU 85 controls display 46 to first show the temperature located in its volatile memory along with the temperature range broken (e.g., HIGH TEMP1, HIGH TEMP2, LOW TEMP1, LOW TEMP2) for four seconds and then show the elapsed time registered in the volatile memory for four seconds.

If the receiving party is interested in viewing the temperature monitoring parameters originally programmed into device 13, the receiving party is required to depress button 45 of user input device 41 for greater than four seconds. In response, CPU 85 displays the "OK" icon 83 for 1 second, then the temperature registered in the volatile memory for 4 seconds, the "HIGH TEMP" and "1" icons 67 and 69 along with the value of the upper inner temperature UI for 4 seconds, the "HIGH TEMP" and "2" icons 67 and 71 along with the value of the upper outer temperature UO for 4 seconds, the "LOW TEMP" and "1" icons 73 and 75 along with the value of the lower inner temperature LI for 4 seconds, the "LOW TEMP" and "2" icons 73 and 77 along with the value of the lower outer temperature LO for 4 seconds, the "DELAY" icon 65 along with the value of the time delay for 4 seconds, the "HIGH TEMP" and "EXCUR." icons 67 and 59 along with the value of the time limit corresponding to first high temperature range HIGH TEMP1 for 4 seconds, the "LOW TEMP" and "EXCUR." icons 73 and 59 along with the value of the time limit corresponding to first low temperature range LOW TEMP1 for 4 seconds, and then the "INT." icon 63 along with the value associated with each time interval.

As noted briefly above, display 47 is not limited to being in the form of a liquid crystal display. Rather, it is to be understood that display 47 could alternatively being in the form of a pair of light emitting diodes (LED), one LED being green in color and one LED being red in color. FIG. 15 shows a chart which illustrates how the LCD of the present invention as well as the combination of a red LED and a green LED could preferably respond to various operating conditions for temperature monitoring device 13.

The embodiments shown in the present invention are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A device for monitoring temperature over a period of time, said device comprising:
   (a) a temperature sensor for taking temperature measurements, and
   (b) a central processing unit (CPU) in electrical connection with said temperature sensor, said CPU comprising memory, said memory consisting of volatile memory into which the temperature measurements are stored, said volatile memory storing no more than a single temperature measurement at a time,
   (c) wherein said device is free of memory external to said CPU.

2. The device of claim 1 further comprising a power source electrically connected to said CPU, said power source having a finite lifespan.

3. The device of claim 2 wherein said power source continuously applies power to said CPU throughout the lifespan of said power source.

4. The device of claim 3 further comprising a protective housing, wherein said device is free of externally accessible means for suspending the application of power from said power source to said CPU.

5. The device of claim 1 wherein each temperature measurement overwrites the previous temperature measurement stored in the volatile memory for said CPU.

6. The device of claim 1 wherein said device further comprises a data communication device in electrical connection with said CPU.

7. The device of claim 6 further comprising a protective housing, said data communication device being externally accessible through said protective housing.

8. The device of claim 7 wherein said data communication device is in the form of at least one conductive plate.

9. The device of claim 1 wherein said device is water-resistant.

10. The device of claim 1 further comprising a display in electrical connection with said CPU.

11. The device of claim 10 wherein said display is in the form of a liquid crystal display (LCD).

12. A method of monitoring temperature using a temperature monitoring device, said temperature monitoring device including a temperature sensor and a central processing unit (CPU), the CPU comprising memory, said memory consisting of volatile memory that stores no more than a single temperature measurement at a time, said method comprising the steps of:
   (a) taking a first temperature measurement using said temperature sensor,
   (b) storing the results of said first temperature measurement into the volatile memory of said CPU,
   (c) taking a second temperature measurement using said temperature sensor, and
   (d) storing the results of said second temperature measurement into the volatile memory of said CPU, the results of said second temperature measurement overwriting the results of said first temperature measurement stored in the volatile memory of said CPU.

13. A method of monitoring temperature using a temperature monitoring device, said temperature monitoring device including a temperature sensor and a central processing unit (CPU), the CPU comprising memory, said memory consisting of volatile memory that stores no more than a single temperature measurement at a time, said method comprising the steps of:
   (a) taking a first temperature measurement using said temperature sensor during a first time interval;
   (b) storing the results of said first temperature measurement into the volatile memory of said CPU during the first time interval;
   (c) analyzing the results of said first temperature measurement using said CPU during a second time interval;
   (d) taking a second temperature measurement using said temperature sensor during the second time interval; and
   (e) storing the results of said second temperature measurement into the volatile memory of said CPU during the second time interval, the results of said second temperature measurement overwriting the results of said first temperature measurement stored in the volatile memory of said CPU.

* * * * *